W. F. COCHRANE.
Harvester.
No. 46,178.
Patented Jan'y 31, 1865.
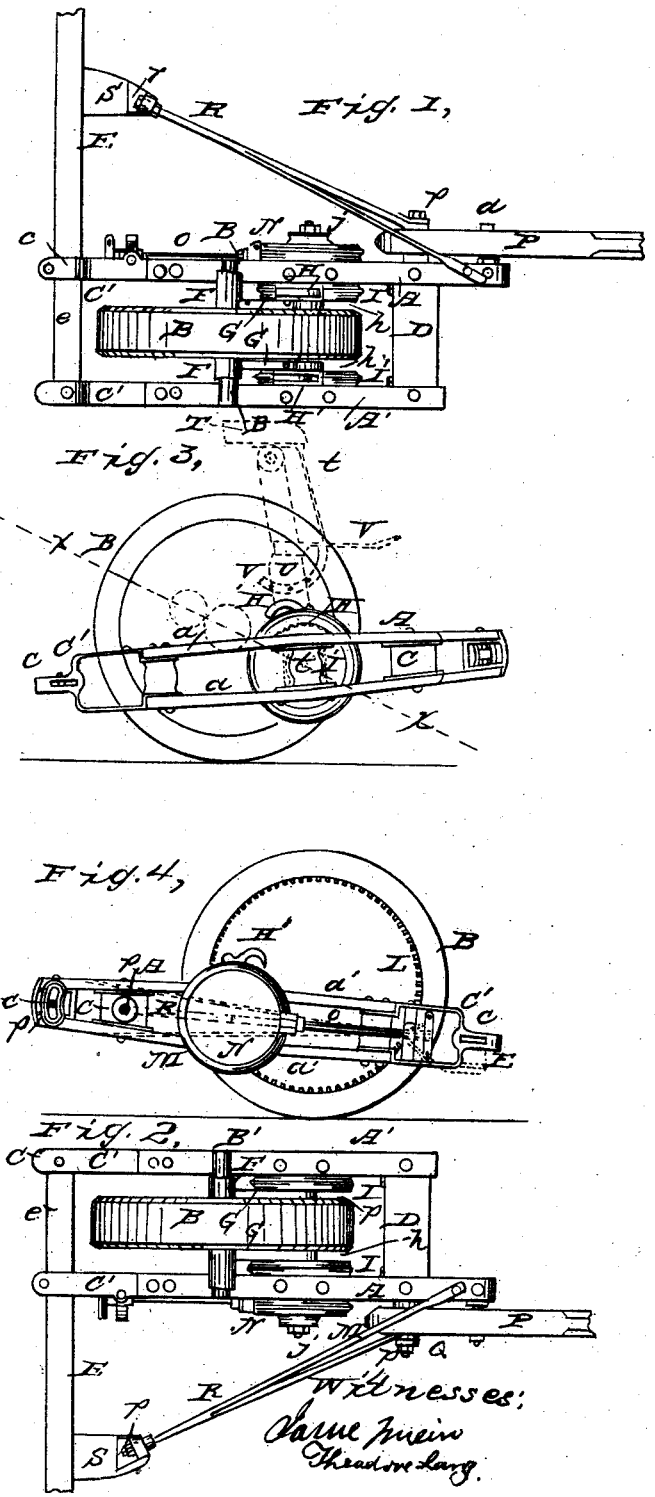

UNITED STATES PATENT OFFICE.

WM. F. COCHRANE, OF SPRINGFIELD, OHIO, ASSIGNOR TO HIMSELF AND WARDER & CHILD, OF SAME PLACE.

IMPROVEMENT IN HARVESTERS.

Specification forming part of Letters Patent No. 46,178, dated January 31, 1865.

*To all whom it may concern:*

Be it known that I, WILLIAM F. COCHRANE, of Springfield, in the county of Clarke and State of Ohio, have invented a new and useful Improvement in Harvesters, of which the following is a full, clear, and exact description, reference being had to the accompanying drawings, which make part of this specification, and in which—

Figure 1 represents a plan or top view of so much of a harvester embracing my improvements as is necessary to illustrate my invention, the machine being shown with its parts arranged to operate as a left-hand machine—that is, a machine with its cutting apparatus projecting from the left-hand side of the main frame. Fig. 2 represents a similar view of the same arranged to operate as a right-hand machine. Fig. 3 represents a view in elevation of the outer or stubble side of the same, as shown in Fig. 1, the driver's seat and rake-gears being shown in red lines. Fig. 4 represents a similar view of the same as seen from the divider side of the machine, the braces which connect the inner shoe and frame being shown in red lines. Fig. 5 represents a transverse section through the gearing at the line $x\ x$, Fig. 3. Figs. 6 and 7 are respectively edge and side views of the pipe-boxes, radius-bars, and ratchets which unite the driving-wheel to the main frame.

The improvement herein claimed consists, first, in constructing the main or gearing frame of a harvester of girder side pieces, combined with brackets at each end and in the middle thereof, substantially as hereinafter shown; secondly, in constructing the brackets which unite the frame-work of symmetrical forms, so as to permit them to be used indifferently either side up or on either side of the machine, substantially as hereinafter described; thirdly, in so constructing the frame that its parts may be reversed in order to change the machine from a right to a left hand one, or vice versa, at pleasure; fourthly, in combining with the main frame a trifurcated brace the prongs of which diverge from the inner shoe, and are respectively secured to the tongue and to the upper and lower sides of the frame; fifthly, in a device for varying the angle of the driver's seat and foot-board, so as to preserve their horizontality while varying the position of the driver's seat.

In the accompanying drawings, which exemplify one mode of carrying out my invention, the main frame is shown as composed of girder side beams, A A', consisting of bars or beams $a\ a'$, arranged in pairs one above the other on each side of the driving-wheel B, and united by brackets C C' at each end, and brackets $i^2$ in the middle thereof, in such manner as to leave an open space between the upper and lower bars. The side pieces A' are connected in front by a tool-box, D, and in rear by the heel-piece or elbow $e$ of the finger-beam E, which enters slots or sockets $c$ in the brackets C', where it is fastened in any suitable manner.

By reference to the drawings it will be seen that the brackets and side pieces are of the same shape both above and below, while the two side beams also correspond in outline. This mode of construction admits of the machine being changed from a right to a left hand one, or vice versa, which is a great advantage, some farmers preferring one kind of machine and some the other. This mode of changing will be more fully described hereinafter.

The driving-wheel B in this instance is shown as turning upon a tube or sleeve, B', which is secured to the pipe boxes or sleeves F of the radius-bars G, so as to form a brace for the frame. Radius-bars G are firmly secured to these pipe-boxes, and carry on their lower ends disks or plates $h\ h'$, which turn on studs or bearings $i\ i'$, forming part of the shell-brackets I I', which have broad bearings $i^2\ i^2$ inserted between and firmly bolted to the frame-timbers, thus materially strengthening and stiffening the frame. The disks $h\ h'$ are provided on their inner faces with small projections or bosses $i^3$, which enter corresponding notches in the flanges of the brackets I I', and thus lock the disks and brackets securely together while permitting the disks to turn freely within the brackets.

Ratchets H are cut upon the rims of the disks $h\ h'$ and engage with the teeth of pawls H', pivoted to the shell-brackets I I', by which means the frame can be held at any desired height from the ground, and can be lowered by merely releasing the pawls from the ratchets, when the frame drops by its own weight.

The stud pin or bearing $i$ is perforated to permit the passage of the counter-shaft J through it. By this arrangement the counter-shaft, in fact, forms the axis of motion of the radius-bars G. Consequently the spur-pinion K on the counter-shaft always remains in gear with the driving-wheel L, no matter how much the frame may be raised or lowered.

A shell, M, secured upon the outer side of the gearing-frame, incloses with its flange the bevel-wheel N and pinion $o$, thus protecting the gearing from dirt. The bevel-wheel N is mounted on the counter-shaft J, and drives the pinion $o$ on the crank-shaft O, which actuates the cutters. The crank-shaft is likewise mounted in swiveling bearings in order to permit the frame to work and twist without binding or straining the gearing.

The tongue P is pivoted so as to play vertically on a stud, $p$, projecting from the side piece A, and may be adjusted and held in any desired position by means of a curved slot, $p'$, on the frame and a set screw, Q, or in some other equivalent way. The side timbers A, it will be observed, are made longer than the others, A', in order to accommodate this arrangement of the tongue.

A forked brace, R, is attached to the shoe S on the finger-beam, its middle prong being pivoted to the pivot $p$ of the tongue, while its upper and lower prongs are respectively secured to the upper and lower sides of the side timbers A. The brace can be tightened or loosened by means of a screw and nut, $r$, on the end next the shoe, and produces an equal strain on those parts of the frame to which its trifurcated ends are attached. This mode of bracing I consider important, having demonstrated its utility in the harvest-field.

The driver's seat T is pivoted on a standard, U, which is pivoted at bottom to the frame in such manner as to permit the standard to be moved back and forth to balance the machine properly. The post U may be adjusted and held by a creased clutch and set-screw, or in any other well-known way. The seat rocks vertically on its pivot, and is connected by a rod, $t$, to a foot-board, V, likewise pivoted vertically on the post. A curved gage-bar, $v$, projects from beneath the seat into a slot in the post, and may be fastened in any desired position by means of a pin entering one of a series of holes in the gage-bar. By this arrangement the seat can be kept horizontal, no matter what may be the inclination of the post T, and the foot-board will uniformly maintain its parallel relation to the driver's seat.

The machine can be raised by lifting on the end of the tongue, which will cause the pawls H' to slide over the ratchets H. When the tongue is lowered again, the pawls seize the ratchet and prevent the descent of the frame, which is thus held up to the height at which it has been set.

In changing the machine from a left-hand one, Fig. 1, to a right-hand one, Fig. 2, the brace R must be detached from the shoe S by unscrewing the nut $r$. The finger-beam is then removed, and the two side pieces, A A', detached from the finger-beam, tool-box D, and driving-wheel, but without detaching the tongue and brace R. The side pieces, A A', are then changed from one side of the frame to the other and turned upside down, while the driving-wheel is reversed by turning it so that its spur-gear L shall again engage with the spur-pinion K. A finger-beam adapted to the side on which the machine is to cut must then be attached to the frame; or the one previously used must be so constructed that its shoes, guard-fingers, and divider can be reversed. Where a platform, reel, and automatic rake are used, it is evident they must be correspondingly changed.

It is obvious that the construction of my frame is such as readily to permit the application of an automatic rake to the machine. It is, however, deemed unnecessary here to describe in detail these and the other portions of the machine, as they form no part of the subject-matter herein claimed, and are, moreover, fully described in other applications for Letters Patent filed simultaneously with this, and respectively marked "A" "C" "D" "E."

What I claim herein as new, and desire to secure by Letters Patent of the United States, is—

1. The combination of the girder side pieces, A A', with the end brackets, C C', and middle brackets, $i^2$, substantially in the manner described, for the purposes set forth.

2. Constructing the frame-brackets C C' and $i^2$ substantially as described, for the purpose of adapting them to either a right or left hand machine.

3. Constructing and arranging the sides A A' of the frame substantially in the manner described, so as to permit them to be reversed and shifted from one side to the other in order to change from a right to a left hand machine, or vice versa, as set forth.

4. The combination of the trifurcated brace R with the inner shoe, tongue, and frame, substantially as and for the purpose described.

5. The combination of the driver's seat and foot-board pivoted on the post U, and connected by the rod $t$ with the gage-bar $v$, as and for the purpose described.

In testimony whereof I have hereunto subscribed my name.

WM. F. COCHRANE.

Witnesses:
 H. E. FOLGER,
 GROVE W. GREEN.